(12) United States Patent
Homan

(10) Patent No.: US 8,672,396 B2
(45) Date of Patent: Mar. 18, 2014

(54) VEHICLE FRONT PORTION STRUCTURE

(75) Inventor: Tadashi Homan, Shizuoka-ken (JP)

(73) Assignee: Suzuki Motor Corporation, Shizuoka-ken (JP)

(*) Notice: Subject to any disclaimer, the term of this patent is extended or adjusted under 35 U.S.C. 154(b) by 0 days.

(21) Appl. No.: 13/700,524

(22) PCT Filed: Apr. 11, 2011

(86) PCT No.: PCT/JP2011/058971
§ 371 (c)(1),
(2), (4) Date: Nov. 28, 2012

(87) PCT Pub. No.: WO2011/152125
PCT Pub. Date: Dec. 8, 2011

(65) Prior Publication Data
US 2013/0069394 A1 Mar. 21, 2013

(30) Foreign Application Priority Data
May 31, 2010 (JP) .................................. 2010-125166

(51) Int. Cl.
*B60N 99/00* (2006.01)

(52) U.S. Cl.
USPC .................................. 296/203.02; 180/68.4

(58) Field of Classification Search
USPC .......... 296/203.01, 203.02, 193.07; 180/68.4; 280/781, 785
See application file for complete search history.

(56) References Cited

U.S. PATENT DOCUMENTS 5,123,695 A * 6/1992 Kanemitsu et al. ...... 296/193.09
5,358,304 A * 10/1994 Kanemitsu et al. ...... 296/193.09
6,408,933 B2 * 6/2002 Fukuoka et al. ................. 165/67
6,540,284 B2 * 4/2003 Miyata ..................... 296/203.02
6,895,647 B2 * 5/2005 Matsumoto et al. ......... 29/281.4
2003/0075305 A1 * 4/2003 Sanada et al. .................... 165/67
2003/0127214 A1 * 7/2003 Sugimoto et al. ............... 165/67
2005/0023864 A1 * 2/2005 Lazzeroni et al. ....... 296/203.02

FOREIGN PATENT DOCUMENTS

| JP | 61163733 U | 10/1986 |
| JP | 2004276202 A | 10/2004 |
| JP | 2005088626 A | 4/2005 |
| JP | 2006327259 A | 12/2006 |
| JP | 2008279812 A | 11/2008 |

OTHER PUBLICATIONS

International Search Report for Application No. PCT/JP2011/058971 dated Jul. 19, 2011.

* cited by examiner

*Primary Examiner* — Lori Lyjak
(74) *Attorney, Agent, or Firm* — Lerner, David, Littenberg, Krumholz & Mentlik, LLP

(57) ABSTRACT

A vehicle front portion structure of a vehicle is equipped with a radiator and an air conditioner, the vehicle front portion structure includes a vehicle body formed by joining a plurality of structural members, a positioning hole formed in the vehicle body, for fitting therein a jig projecting from a mount frame used to transport the vehicle body in a manufacturing process, and a fitting bracket for supporting the radiator and a condenser of the air conditioner from the lower sides of the radiator and the condenser, and featured in that the fitting bracket is formed integrally with a radiator supporting portion for supporting a lower portion of the radiator, and with a condenser supporting portion for supporting a lower portion of the condenser, and is fastened and fixed at a position which interferes with the jig fitted into the positioning hole.

6 Claims, 6 Drawing Sheets

A-A CROSS SECTION

B-B CROSS SECTION

VEHICLE FRONT PORTION STRUCTURE

CROSS-REFERENCE TO RELATED APPLICATIONS

The present application is a national phase entry under 35 U.S.C. §371 of International Application No. PCT/JP2011/058971, filed Apr. 11, 2011, published in Japanese, which claims priority from Japanese Application No.: 2010-125166, filed May 31, 2010, all of which are incorporated herein by reference.

TECHNICAL FIELD

The present invention relates to a vehicle front portion structure of a vehicle equipped with a radiator and a condenser of an air conditioner.

BACKGROUND ART

In the manufacturing process of an automobile, when a vehicle body (frame body) is assembled, main structural members, such as a side member, a cross member, and a floor panel, are positioned on a mount frame and successively connected to each other by welding. Rod-shaped jigs are provided on the mount frame so as to project upward, and positioning holes, into which the jigs are respectively fitted, are provided in the structural members. When the assembling of the structural members by welding is completed, the assembled structural members are unloaded from the mount frame, and a rust inhibitor and paint are sprayed onto the assembled structural members. Thereafter, components and equipment, such as a shaft, an outer panel, an engine, and a radiator, are attached to the assembled structural members. Here, a series of structural members joined to each other by welding is referred to as a vehicle body, and a member attached to the vehicle body by fastening or adhesion afterwards is referred to as a fitting member.

A radiator for cooling engine cooling water is arranged in a front portion of an automobile. When the automobile is equipped with an air conditioner, a condenser for cooling a refrigerant is also arranged in the front portion of the automobile. Each of these members has an area substantially as large as the front grille of the automobile in order to receive a large amount of wind, and has a structure in which many metal fins are arrayed to perform heat exchange with air. Therefore, each of the members has a weight corresponding to its size and structure. For this reason, the radiator and the condenser are supported by brackets joined to a radiator support lower member which is provided at a front end lower portion of the vehicle body and which extends in the vehicle width direction. As a specific example of the supporting structure, a structure is usually adopted in which protrusions are provided at the lower ends of the radiator and the condenser, and in which holes for receiving the protrusions are respectively provided in the brackets.

Mount brackets for supporting the radiator and the condenser are described in Patent Literature 1. Note that the object of the invention disclosed in Patent Literature 1 is that, by means of a structure in which a plate for protecting the cooling system is provided in front of the mount brackets, and in which the mount brackets are moved so as to follow the plate, the amount of movement of the bumper beam is secured at the time of collision and thereby damage to members of the cooling system is prevented.

CITATION LIST

Patent Literature

[Patent Literature 1] Japanese Patent Laid-Open No. 2008-279812

SUMMARY OF INVENTION

Technical Problem

Each of the jigs of the mount frame described above, and each of the brackets for supporting the radiator or the condenser are respectively arranged at portions of the front end and the width direction end of the vehicle, and hence are arranged at similar positions. A positioning hole, into which the jig is fitted, cannot be provided at the position at which the bracket is provided. For this reason, when a new vehicle body is designed, it is necessary to design the vehicle body so that the bracket is arranged so as to avoid the position of the jig, or it is necessary to modify the mount frame so that the jig is placed at a position avoiding the bracket.

When the vehicle body is designed so that the bracket is arranged so as to avoid the position of the jig, there is a possibility that the arrangement and the size of the radiator and the condenser, which can be used, are limited, and that the shape of the bracket is distorted so that the strength of the bracket becomes difficult to be secured. On the other hand, when the mount frame is modified so that the jig is arranged so as to avoid the position of the bracket, since the mount frame has a robust structure, and since the number of portions to be modified is large, there is a possibility that a modification period of the jig is needed before the start of the manufacture, and that the cost for modification of the jig is required and thereby the manufacturing cost is increased.

Therefore, an object of the present invention is to provide a vehicle front portion structure which enables a radiator or a condenser to be arranged irrespective of the position of the positioning hole into which the jig is fitted.

Solution to Problem

In order to solve the above-described problems, as a typical configuration of the present invention, there is provided a vehicle front portion structure of a vehicle equipped with a radiator and an air conditioner, the vehicle front portion structure being featured by including a vehicle body formed by joining a plurality of structural members, a positioning hole formed in the vehicle body so as to be fitted with a jig projecting from a mount frame used for transporting the vehicle body in a manufacturing process, and a fitting bracket for supporting the radiator and a condenser of the air conditioner from the lower side of the radiator and the condenser, and featured in that the fitting bracket is formed integrally with a radiator supporting portion for supporting a lower portion of the radiator and with a condenser supporting portion for supporting a lower portion of the condenser, and is fastened and fixed at a position which interferes with the jig fitted into the positioning hole.

With the above-described configuration, the radiator and the condenser can be supported by the retrofitted fitting bracket. In the manufacturing process, the fitting bracket is attached to the vehicle body after the vehicle body is unloaded from the mount frame, and hence there is no possibility that the jig of the mount frame interferes with the fitting bracket. Therefore, the fitting bracket can be arranged irrespective of the position of the positioning hole, and hence the design flexibility can be improved. Further, since an existing jig can be used, the mount frame need not be modified, and hence the manufacturing cost can be reduced. Further, the radiator supporting portion and the condenser supporting portion, which are large holes, need not be provided in the vehicle body, and hence the strength of the vehicle body can be improved. Further, since both the radiator and the condenser can be supported by one fitting bracket, the number of components can be reduced, and hence the assembly process can be simplified.

It may be configured such that the radiator supporting portion is located above a fastening fixing portion at which the fitting bracket is fastened and fixed to the vehicle body, and such that the vehicle body under the radiator supporting portion is formed in a shape which bulges downward below the fastening fixing portion.

When the radiator is mounted on the radiator supporting portion, a part of the radiator is made to project downward from the radiator supporting portion. To cope with this, it is conceivable that the radiator supporting portion is positioned sufficiently high. However, when the vehicle body is formed in the downwardly bulging shape as described above, it is possible to secure the height of the space between the radiator supporting portion and the vehicle body while minimizing the height to which the radiator supporting portion is raised. Thereby, the strength of the fitting bracket can be prevented from being reduced, and also the height, to which the radiator having a heavy weight is raised, is reduced. Further, the lower end of the radiator can be positioned low, and hence the radiator having a larger surface area can be installed.

It is preferred that the condenser supporting portion is arranged at a position higher than the position at which the radiator supporting portion is arranged, and that the fitting bracket includes an inclined surface connecting the radiator supporting portion with the condenser supporting portion, and a flange formed at the edge of the inclined surface.

In the above-described configuration, the condenser supporting portion and the radiator supporting portion are connected with each other by the inclined surface, and hence it is possible to obtain a stiffness that withstands not only a vertical load but also a lateral load. Further, the stiffness of the inclined surface is increased by the flange, and thereby the vibration can be further suppressed.

It is preferred that a bracket side drain hole be provided at a lowest position of the lower surface of the fitting bracket, and that a vehicle body side drain hole is provided at a position of the vehicle body, the position corresponding to the bracket side drain hole. Thereby, water can be efficiently drained. Therefore, even in the case where the fitting bracket is retrofitted to the vehicle body, water is not accumulated in the fastening portion of the fitting bracket, and hence it is possible to effectively prevent rust formation.

Advantageous Effects of Invention

In the vehicle front portion structure according to the present invention, the radiator or the condenser can be arranged irrespective of the position of the positioning hole of the vehicle body, into which hole the jig is fitted.

DESCRIPTION OF EMBODIMENTS

Figure 1:
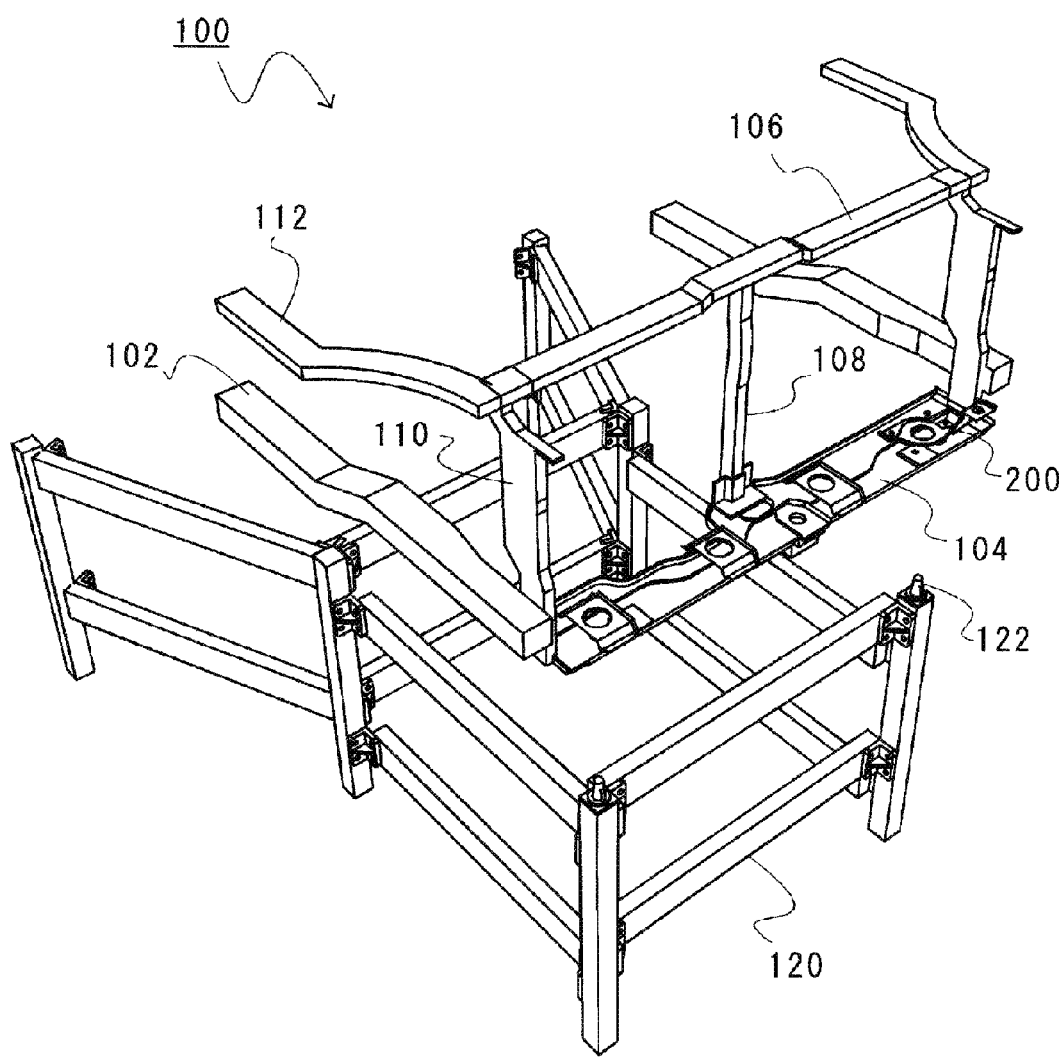
FIG. 1 is a view for explaining a vehicle body and a mount frame on which the vehicle body is mounted in a manufacturing process.

In the following, a preferred embodiment according to the present invention will be described in detail with reference to the accompanying drawings. The size, the material, the other specific numerical values, and the like, are only exemplary to facilitate the understanding of the present invention, and do not limit the present invention unless otherwise specified. Note that, in this specification and accompanying drawings, elements having substantially the same function and configuration are denoted by the same reference numeral or the same reference character, and the duplicated explanation thereof is omitted. Further, illustration of elements that are not directly related to the present invention are omitted.

FIG. 1 is a view for explaining a vehicle body and a mount frame on which the vehicle body is mounted in a manufacturing process. FIG. 1 shows a vehicle body 100, which is a vehicle body (formed by joining a series of structural members by welding) in the middle of assembly, and shows only a vehicle front side portion of the vehicle body. Specifically, the following structural members are joined to each other by welding. That is, side members 102 extending in the vehicle longitudinal direction (front rear direction), a radiator support lower member 104 located on the vehicle front lower side and extending in the vehicle width direction, a hood lock member 106 located on the vehicle front upper side and extending in the vehicle width direction, a hood lock member brace 108 serving as a central post of the vehicle front surface, lamp support braces 110 each serving as a column near a lamp, lamp support members 112 each serving as a side beam of an engine room, and the like, are joined to each other. Further, in addition to these members, many structural members (not shown), such as a floor panel and a cross member, are joined, but the description thereof is omitted here. Note that in some types of vehicles, all of these members are not necessarily provided, and also in some types of vehicle, the names of some of the members may be different. Therefore, in the following, an example of a vehicle body structure will be described. The present invention relates to a structure around a member located on the vehicle front lower side and extending in the vehicle width direction, that is, relates to a structure around a member referred to as the radiator support lower member 104 in the present embodiment.

The vehicle body 100 is assembled in such a manner that the structural members are successively welded to each other while being positioned by means of a mount frame 120. The mount frame 120, which is a pedestal assembled with angle members, steel frames, and the like, is provided so that jigs 122 for respectively positioning the structural members project upward (all the structural members are not positioned by the mount frame). In FIG. 1, the vehicle body 100 and the mount frame 120 are shown to be separated from each other for the purpose of description, but of course, in practice, the vehicle body 100 is in the state of being mounted on the mount frame 120. When the assembling of the structural members of the vehicle body 100 by welding is completed, the vehicle body 100 is extracted from the jigs 122 by being pulled upward, so as to be unloaded from the frame 120. In the subsequent process, a rust inhibitor and paint are sprayed onto the vehicle body 100. Thereafter, components and equipment, such as a shaft, an outer panel, an engine, and a radiator, and interior members are attached to the vehicle body 100. Here, a series of structural members joined to each other by welding is referred to as the vehicle body 100, and a member attached to the vehicle body 100 by fastening or adhesion afterwards is referred to as a fitting member.

Figure 2A:
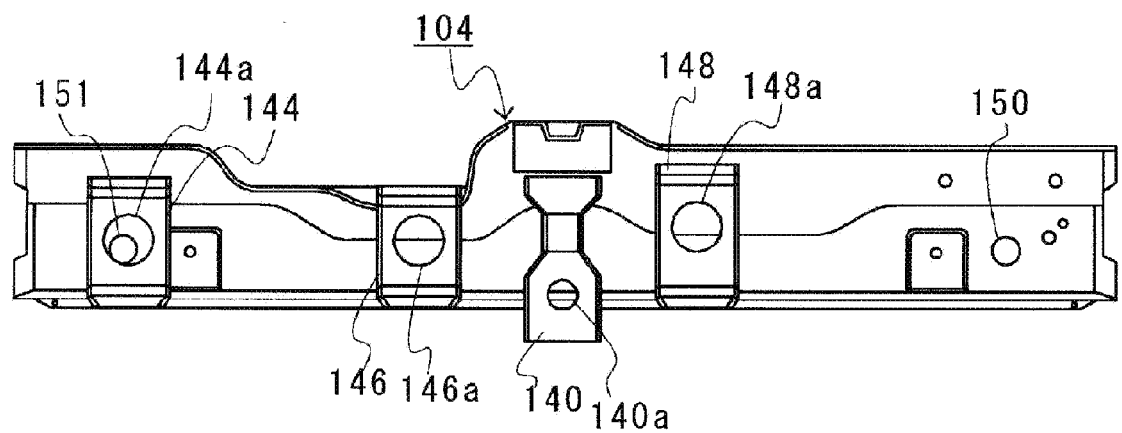
FIG. 2 is a view for explaining a radiator support lower member.
Figure 2B:
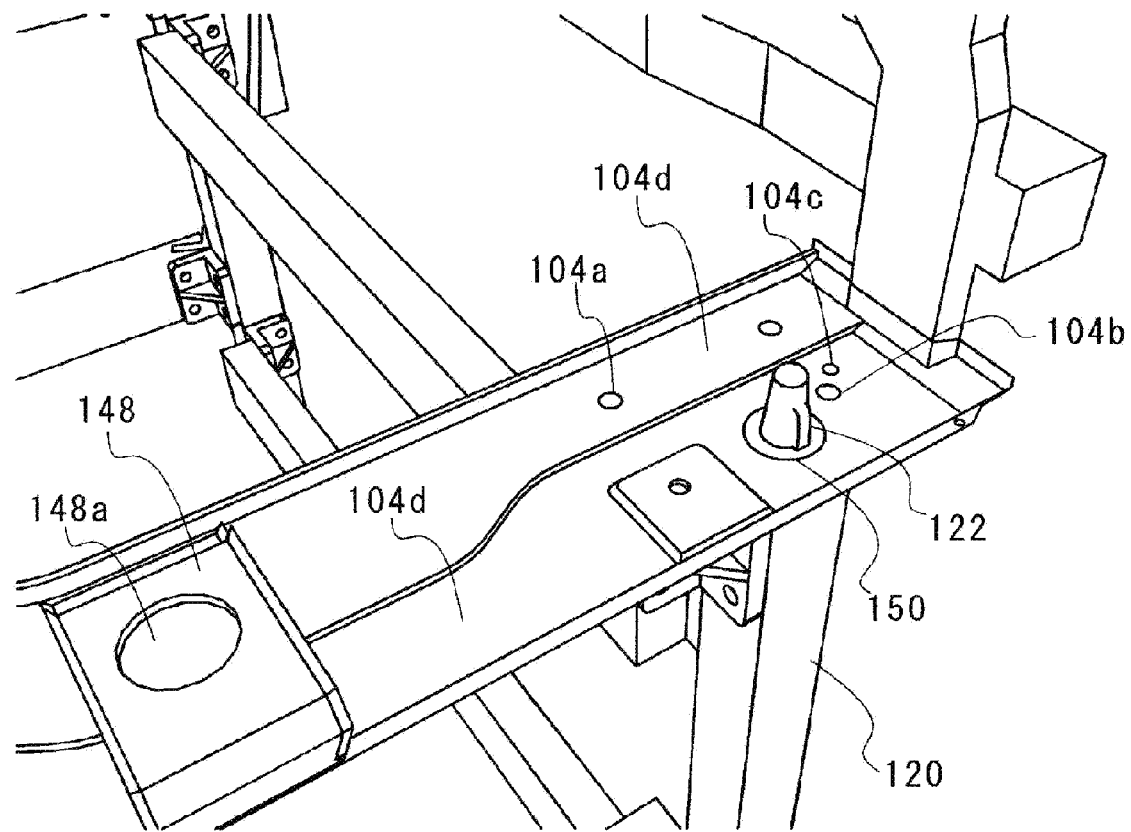

FIG. 2 is a view for explaining the radiator support lower member 104. FIG. 2(a) is a plan view of the radiator support lower member 104, and FIG. 2(b) is a perspective view of a major portion of the radiator support lower member 104. The radiator support lower member 104 is located below a front grille covering a front surface of the vehicle, and supports a radiator 130 (see FIG. 6). In most of vehicles in recent years, an air conditioner is normally equipped, and hence a condenser 132 of the air conditioner is also supported by the radiator support lower member 104.

Figure 3A:
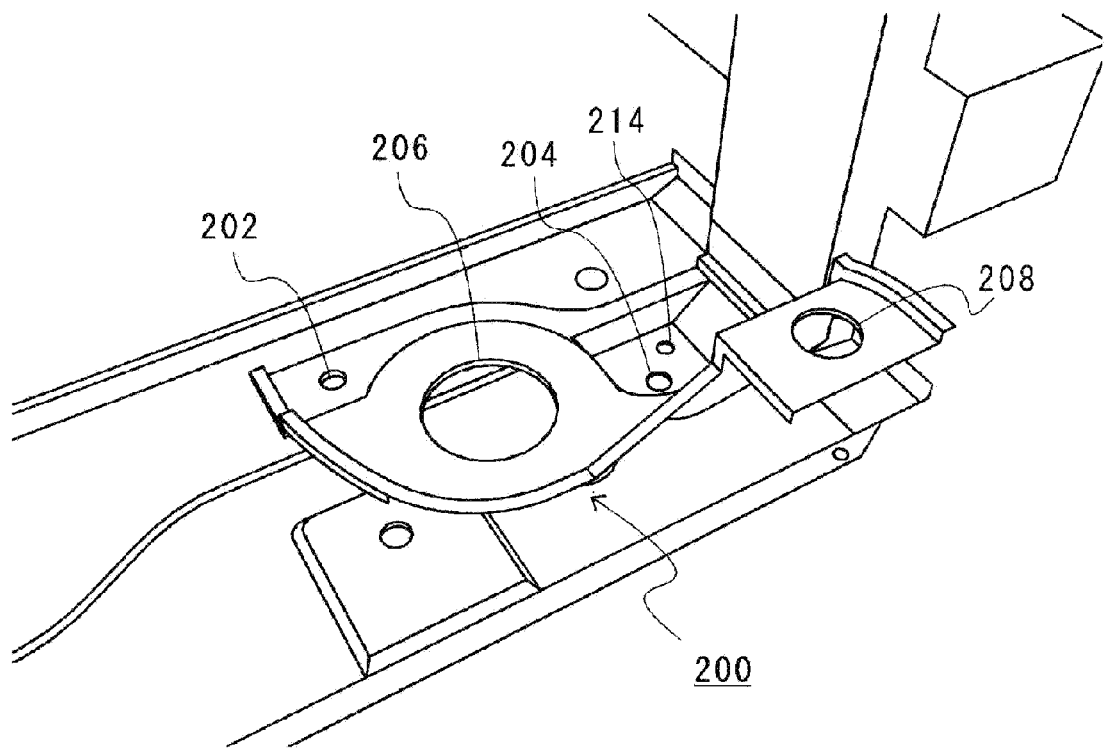
FIG. 3 is a view for explaining a fitting bracket.
Figure 3B:
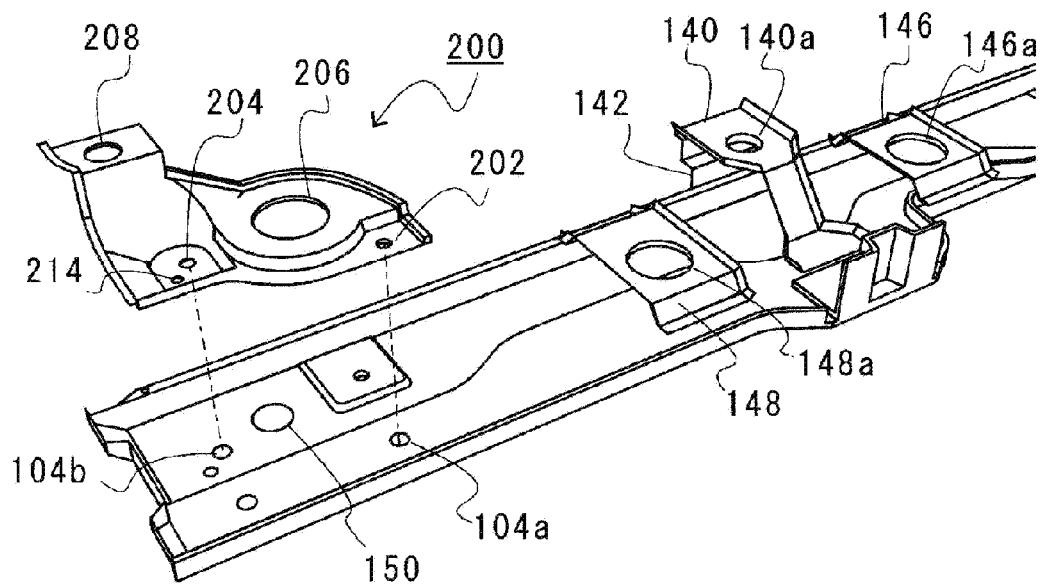

The radiator support lower member 104 includes, at the center thereof, a condenser lower bracket 140, and a condenser lower bracket reinforcement 142 (see FIG. 3(b)), and supports a lower end of the condenser 132. A condenser supporting portion 140a, which is a hole for fitting therein a mounting rod (not shown) projecting downward from the condenser 132, is formed in the condenser lower bracket 140. The other side of the condenser 132 is supported by a fitting bracket 200 described below. The condenser lower bracket 140 and the condenser lower bracket reinforcement 142 are joined by welding, and hence are a part of the vehicle body 100.

Further, radiator lower brackets 144, 146 and 148 are provided on the radiator support lower member 104. Radiator supporting portions 144a, 146a, and 148a, which are holes for respectively fitting therein mounting rods (not shown) projecting downward from the radiator 130, are formed in the radiator lower brackets 144, 146 and 148, respectively. In the present embodiment, two radiators are mounted side by side in the vehicle width direction, and the radiator (not shown) on the right side of the vehicle is supported by the radiator supporting portions 144a and 146a. Further, the radiator 130 (see FIG. 6) on the left side of the vehicle is supported by the radiator supporting portion 148a and a radiator supporting portion 206 of the fitting bracket 200, which radiator supporting portion 206 will be described below. The vehicle left side end portion of the radiator 130 is supported by the fitting bracket 200 as will be described below. These brackets are joined by welding, and hence are a part of the vehicle body 100.

Further, positioning holes 150 and 151 for respectively fitting therein the jigs 122 of the mount frame 120 are formed in the radiator support lower member 104. The positioning holes 150 and 151 are set on the basis of the positions of the jigs 122 which are already provided in the mount frame 120.

Here, as can be seen from the brackets 140, 144, 146 and 148, when a bracket is provided as a part of the vehicle body 100, it is necessary to join a large bracket to the vehicle body 100 in order to form a hole as a supporting portion. In this case, it is difficult to provide the positioning hole 150 for the jig 122 at a position avoiding the bracket, and hence the position of the positioning hole 150 on the left side of the vehicle overlaps with the vehicle left end position at which the radiator 130 and the condenser 132 are to be supported. To cope with this, in the present embodiment, the radiator 130 and the condenser 132 are supported by using the fitting bracket 200.

FIG. 3 is a view for explaining the fitting bracket 200. FIG. 3(a) is a perspective view in a state where the fitting bracket 200 is attached to the radiator support lower member 104, and FIG. 3(b) is a perspective view in a state where the fitting bracket 200 is separated from the radiator support lower member 104. The fitting bracket 200 is formed by bending a sheet metal, and is fastened and fixed to the radiator support lower member 104. The fitting bracket 200 is formed integrally with fastening fixing portions 202 and 204, the radiator supporting portion 206 fitted with a lower mounting portion 131 of the radiator 130 (see FIG. 6(c)), and a condenser supporting portion 208 fitted with a lower mounting portion 133 of the condenser 132 (see FIG. 6(c)).

The fastening fixing portion 202 and 204 are bolt holes for fixing the fitting bracket 200 to the radiator support lower member 104. Bracket fixing holes 104a and 104b are provided in the radiator support lower member 104, and the fitting bracket 200 is fastened and fixed to the radiator support lower member 104 by bolts (not shown). As for the specific shapes of the radiator supporting portion 206 and the condenser supporting portion 208, each of the portions is a hole larger than each of the bracket fixing holes 104a and 104b.

Figure 4:
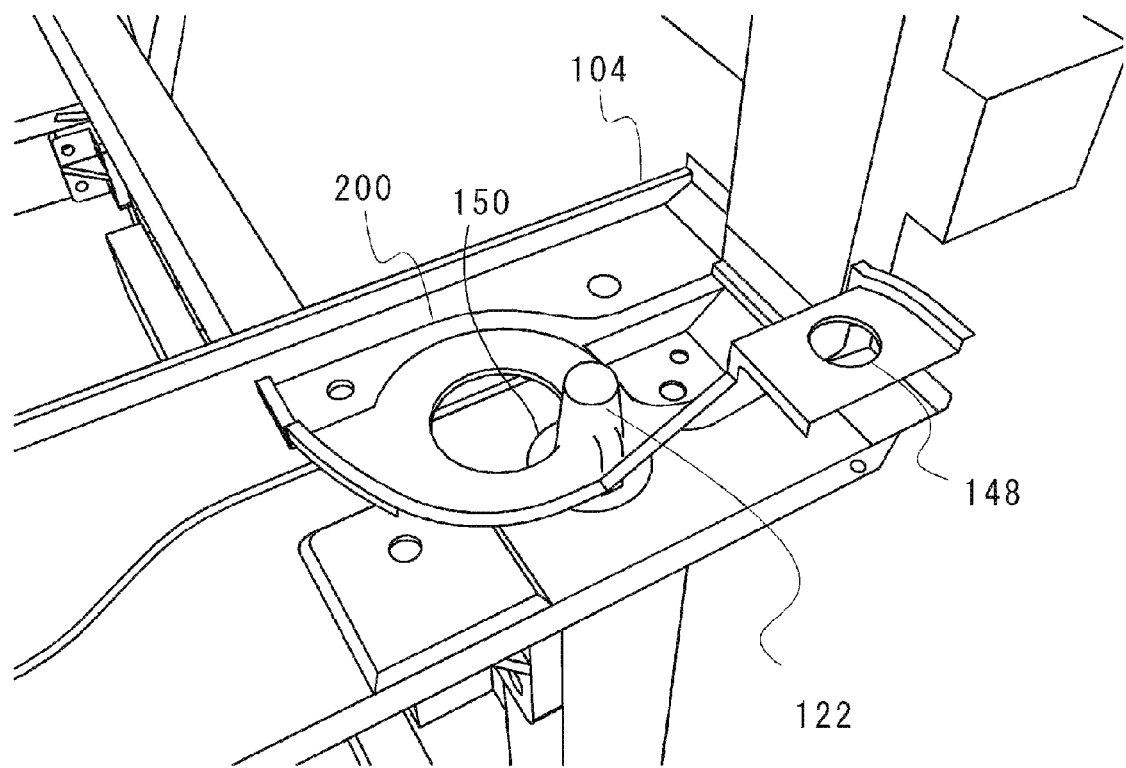
FIG. 4 is a virtual view showing a case in which the fitting bracket and a jig exist at the same time.

The fitting bracket 200 is fastened and fixed at a position at which the fitting bracket 200 covers the positioning hole 150. FIG. 4 is a virtual view showing a case where the fitting bracket 200 and the jig 122 exist at the same time. As shown in FIG. 4, when the jig 122 is temporarily fitted into the positioning hole 150, the jig 122 and the fitting bracket 200 are located at positions where the jig 122 and the fitting bracket 200 interfere with each other. However, in the manufacturing process, the fitting bracket 200 is attached to the vehicle body 100 after the vehicle body 100 is unloaded from the mount frame 120, and hence there is no possibility that the jig 122 of the mount frame 120 interferes with the fitting bracket 200.

Therefore, the fitting bracket 200 can be arranged irrespective of the position of the positioning hole 150, so that the design flexibility can be improved. Further, since the existing jig 122 can be used, the mount frame 120 need not be modified, and hence the manufacturing cost can be reduced. Further, the radiator supporting portion and the condenser supporting portion, which are large holes, need not be provided in the vehicle body 100, and hence the strength of the vehicle body 100 can be improved.

Further, since both of the radiator 130 and the condenser 132 can be supported by the one fitting bracket 200, the number of components can be reduced, and hence the assembly process can be simplified.

Figure 5A:
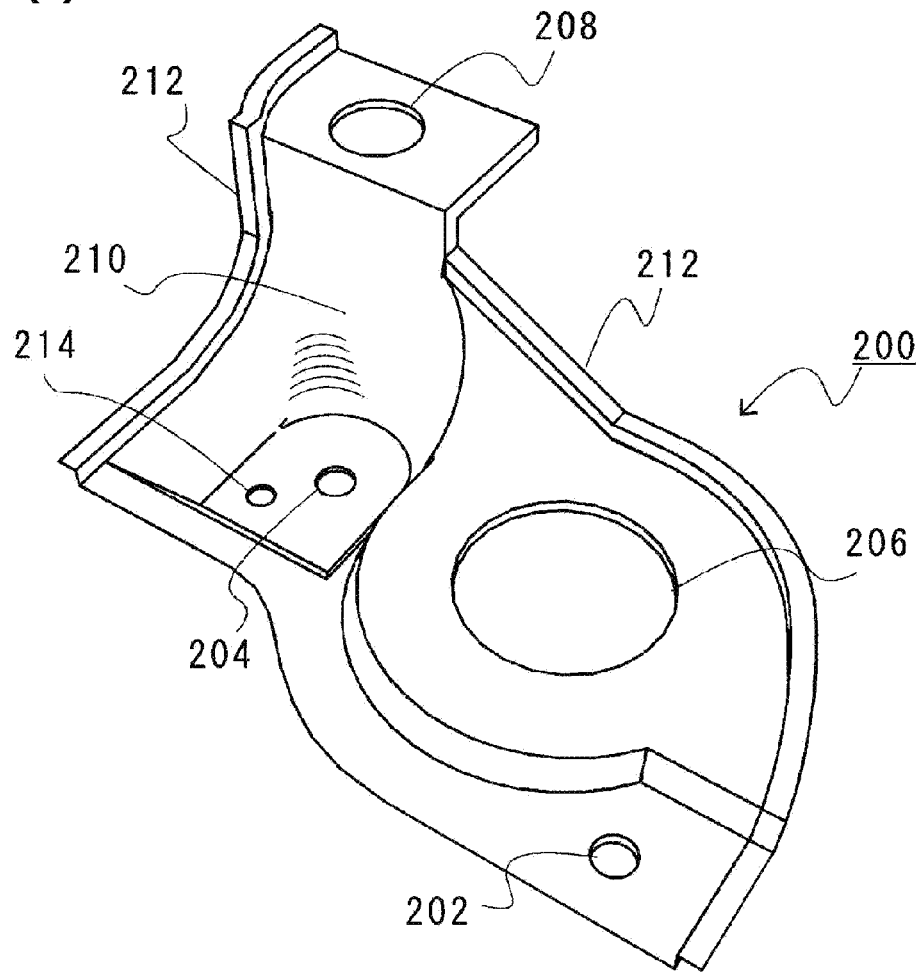
FIG. 5 is a view of the fitting bracket seen from a different direction.
Figure 5B:
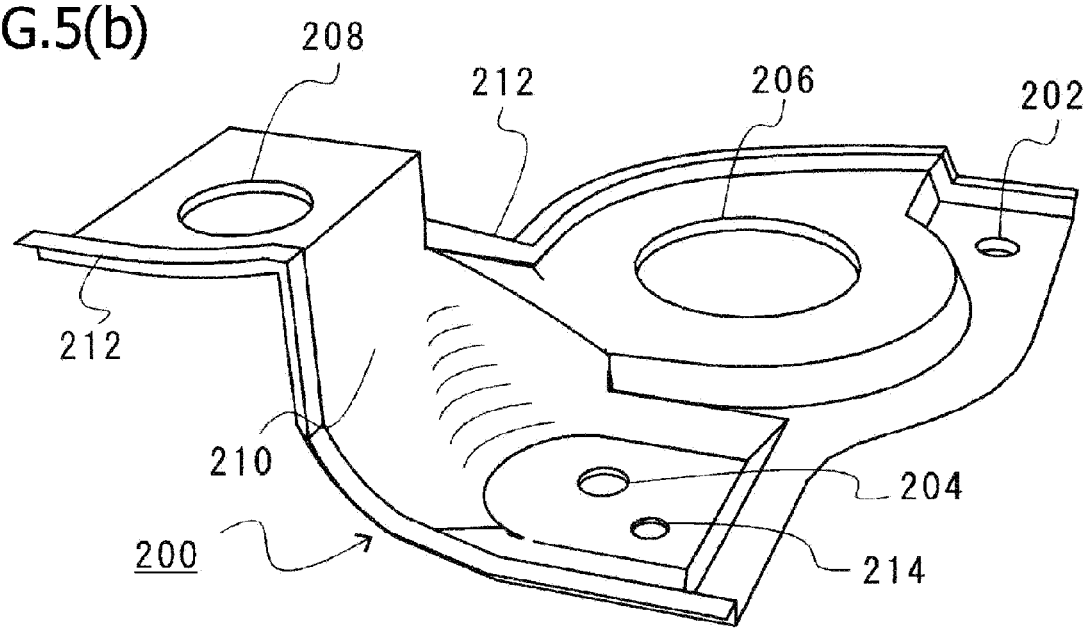

Next, the shape of the fitting bracket 200 will be described in detail. FIG. 5 is a view of the fitting bracket 200 seen from a different direction.

As shown in FIG. 5, the radiator supporting portion 206 is located at a position higher than the fastening fixing portions 202 and 204 for fixing the fitting bracket 200 to the vehicle body 100, and further, the condenser supporting portion 208 is arranged at a position further higher than the radiator supporting portion 206. This is because the vertical width of the radiator 130 is greater than the vertical width of the condenser 132, and hence the position at which the lower end of the radiator 130 is supported is lower than the position at which the lower end of the condenser 132 is supported.

The radiator supporting portion 206 and the condenser supporting portion 208 are connected to each other by an inclined surface 210. Further, a flange 212 is formed at the edge of the inclined surface 210. The inclined surface 210 is not an upright wall surface, but is a surface inclined at a certain angle. Thereby, it is possible to obtain a stiffness that withstands not only a vertical load but also a lateral load. Therefore, vibration of the condenser 132 supported at a high position can be suppressed during the traveling of the vehicle.

Further, the stiffness of the inclined surface 210 is increased by the flange 212, and thereby the vibration can be further suppressed.

Further, a bracket side drain hole 214 is provided at a lowest position of the lower surface of the fitting bracket 200. Correspondingly, a vehicle body side drain hole 104c is formed at a position of the radiator support lower member 104, which position corresponds to the bracket side drain hole 214 (see FIG. 2(b)). Thereby, rain water, and the like, which tends to accumulate at the position of the fitting bracket 200, can be efficiently drained. Therefore, even in the case in which the fitting bracket 200 is retrofitted to the radiator support lower member 104, water is not accumulated between the fitting bracket 200 and the radiator support lower member 104, and hence it is possible to effectively prevent rust formation.

Figure 6A:
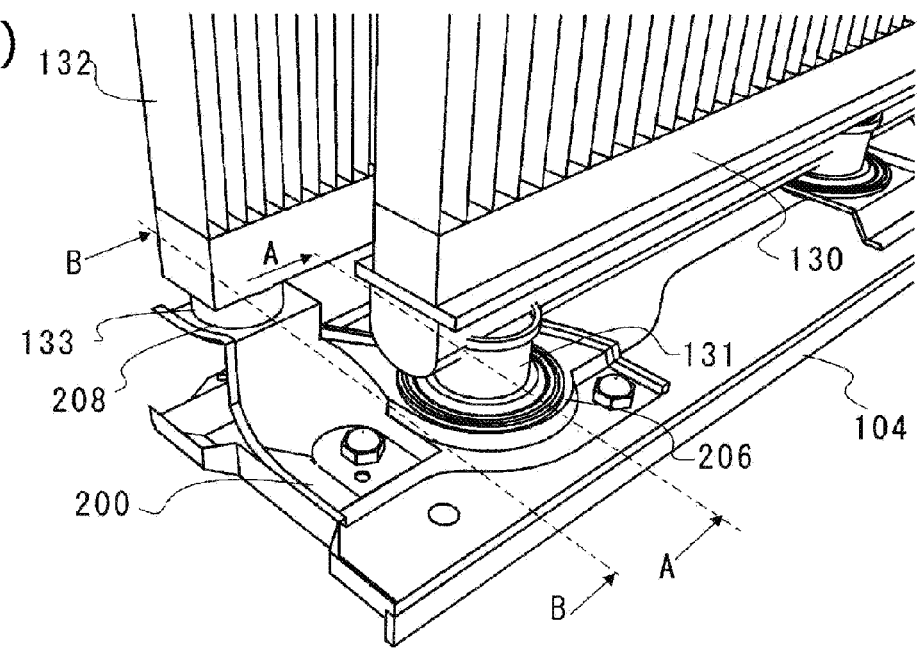
FIG. 6 is a view showing a state in which a radiator and a condenser are supported by the fitting bracket.

FIG. 6 is a view showing a state in which the radiator 130 and the condenser 132 are supported by the fitting bracket 200. FIG. 6(a) is a perspective view showing the vicinity of the fitting bracket 200. The radiator 130 and the condenser 132 are supported by the fitting bracket 200 in such a manner that the vehicle left side end portion of the radiator 130 is attached to the radiator supporting portion 206, and that the vehicle left side end portion of the condenser 132 is attached to the condenser supporting portion 208.

Figure 6B:
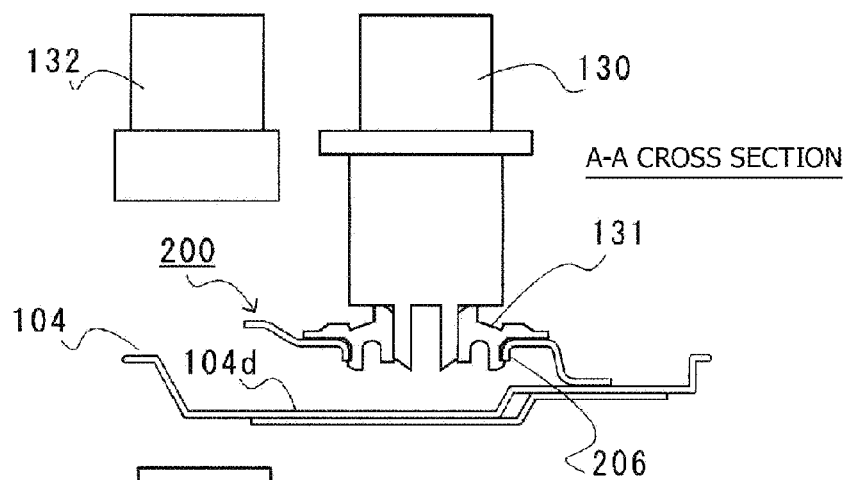

FIG. 6(b) is a sectional view taken along line A-A in FIG. 6(a). On the radiator support lower member 104, a bulging stepped portion 104d is formed at a position lower than the fastening fixing portions 202 and 204 and under the radiator supporting portion 206. Because of this, and also because the radiator supporting portion 206 is located at a position higher than the positions of the fastening fixing portions 202 and 204, a space having a sufficient height can be formed between the radiator supporting portion 206 and the radiator support lower member 104.

When the radiator 130 is mounted on the radiator supporting portion 206, the lower mounting portion 131 of the radiator 130 projects downward from the radiator supporting portion 206. To cope with this, it is conceivable that the radiator supporting portion 206 is positioned sufficiently high. However, when the stepped portion 104d is formed on the radiator support lower member 104 as described above, it is possible to secure the height of the space between the radiator supporting portion 206 and the radiator support lower member 104, while minimizing the height to which the radiator supporting portion 206 is raised. Thereby, it is possible to prevent the strength of the fitting bracket 200 from being reduced, and it is also possible to facilitate the assembly process because the height, to which the heavy radiator 130 is raised, is reduced. Further, since the lower end of the radiator 130 can be positioned low, the radiator having a larger surface area can be installed, and the height of the front grille can be lowered. As a result, the design flexibility can be improved.

Figure 6C:
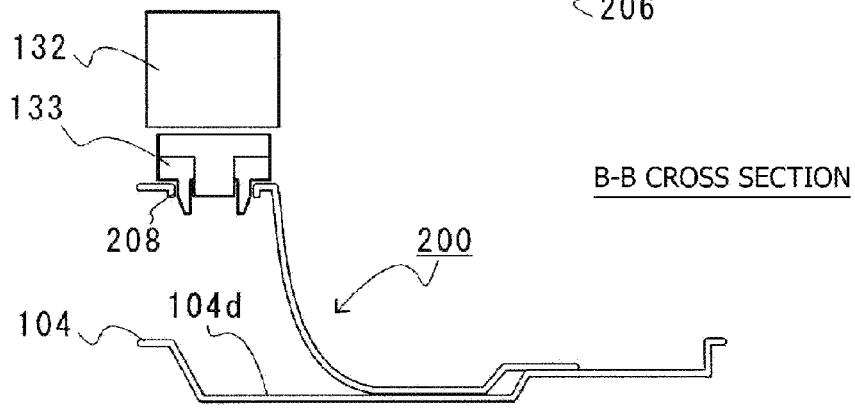

FIG. 6(c) is a sectional view taken along line B-B in FIG. 6(a). A drain water discharge pipe is provided at a lower portion of the radiator 130, but such member is not provided at the condenser 132. For this reason, as shown in FIG. 6(c), the condenser supporting portion 208 can be positioned high, so that the height of the cooling portion (the area of the heat dissipation plate) of the radiator 130 is aligned with the height of the cooling portion of the condenser 132.

In the above, a preferred embodiment according to the present invention has been described with reference to the accompanying drawings, but the present invention is not limited to this embodiment. It is apparent that various changes and modifications may occur to those skilled in the art within the scope of the invention as claimed in the appended claims, and it is of course understood that such changes and modifications are also included within the scope of the present invention.

For example, a case is described in which the fitting bracket 200 is arranged on the left side of the vehicle, but the fitting bracket 200 may be arranged on the right side of the vehicle. Further, the stiffness of the fitting bracket 200 may be increased by providing a bead (ridge-like bent portion) on the inclined surface 210 of the fitting bracket 200.

INDUSTRIAL APPLICABILITY

The present invention can be used as a vehicle front portion structure of a vehicle equipped with a radiator and a condenser of an air conditioner.

REFERENCE SIGNS LIST

100 Vehicle body
102 Side member
104 Radiator support lower member
104a Bracket fixing hole
104b Bracket fixing hole
104c Vehicle body side drain hole
104d Stepped portion
106 Hood lock member
108 Hood lock member brace
110 Lamp support brace
112 Lamp support member
120 Mount frame
122 Jig
130 Radiator
131 Lower mounting portion
132 Condenser
133 Lower mounting portion
140 Condenser lower bracket
140a Condenser supporting portion
142 Condenser lower bracket reinforcement
144 Radiator lower bracket
144a Radiator supporting portion
146 Radiator lower bracket
146a Radiator supporting portion
148 Radiator lower bracket
148a Radiator supporting portion
150 Positioning hole
151 Positioning hole
200 Fitting bracket
202 Fastening fixing portion
204 Fastening fixing portion
206 Radiator supporting portion
208 Condenser supporting portion
210 Inclined surface
212 Flange
214 Bracket side drain hole

The invention claimed is:

1. A vehicle front portion structure of a vehicle equipped with a radiator and an air conditioner, the vehicle front portion structure comprising:
   a vehicle body formed by joining a plurality of structural members;
   a positioning hole formed in the vehicle body, for fitting therein a jig projecting from a mount frame used to transport the vehicle body in a manufacturing process; and
   a fitting bracket for supporting the radiator and a condenser of the air conditioner from the lower side of the radiator and the condenser, wherein the fitting bracket is formed integrally with a radiator supporting portion for supporting a lower portion of the radiator, and with a condenser supporting portion for supporting a lower portion of the condenser, and is fastened and fixed at a position which interferes with the jig fitted into the positioning hole.

2. The vehicle front portion structure according to claim 1, wherein the radiator supporting portion is located above a fastening fixing portion between the fitting bracket and the vehicle body, and the vehicle body under the radiator supporting portion is formed in a shape which bulges downward below the fastening fixing portion.

3. The vehicle front portion structure according to claim 1, wherein the condenser supporting portion is arranged at a position higher than the position of the radiator supporting portion, and the fitting bracket includes an inclined surface connecting the radiator supporting portion with the condenser supporting portion, and a flange formed at the edge of the inclined surface.

4. The vehicle front portion structure according to claim 1, wherein a bracket side drain hole is provided at a lowest position of the lower surface of the fitting bracket, and a vehicle body side drain hole is provided at a position of the vehicle body, the position corresponding to the bracket side drain hole.

5. The vehicle front portion structure according to claim 2, wherein the condenser supporting portion is arranged at a position higher than the position of the radiator supporting portion, and the fitting bracket includes an inclined surface connecting the radiator supporting portion with the condenser supporting portion, and a flange formed at the edge of the inclined surface.

6. The vehicle front portion structure according to claim 3, wherein a bracket side drain hole is provided at a lowest position of the lower surface of the fitting bracket, and a vehicle body side drain hole is provided at a position of the vehicle body, the position corresponding to the bracket side drain hole.

* * * * *